May 5, 1959　　　T. W. KALBOW　　　2,885,204
ARTICLE FOLDING AND ASSEMBLING APPARATUS
Filed July 22, 1955　　　　　　　　　3 Sheets-Sheet 2
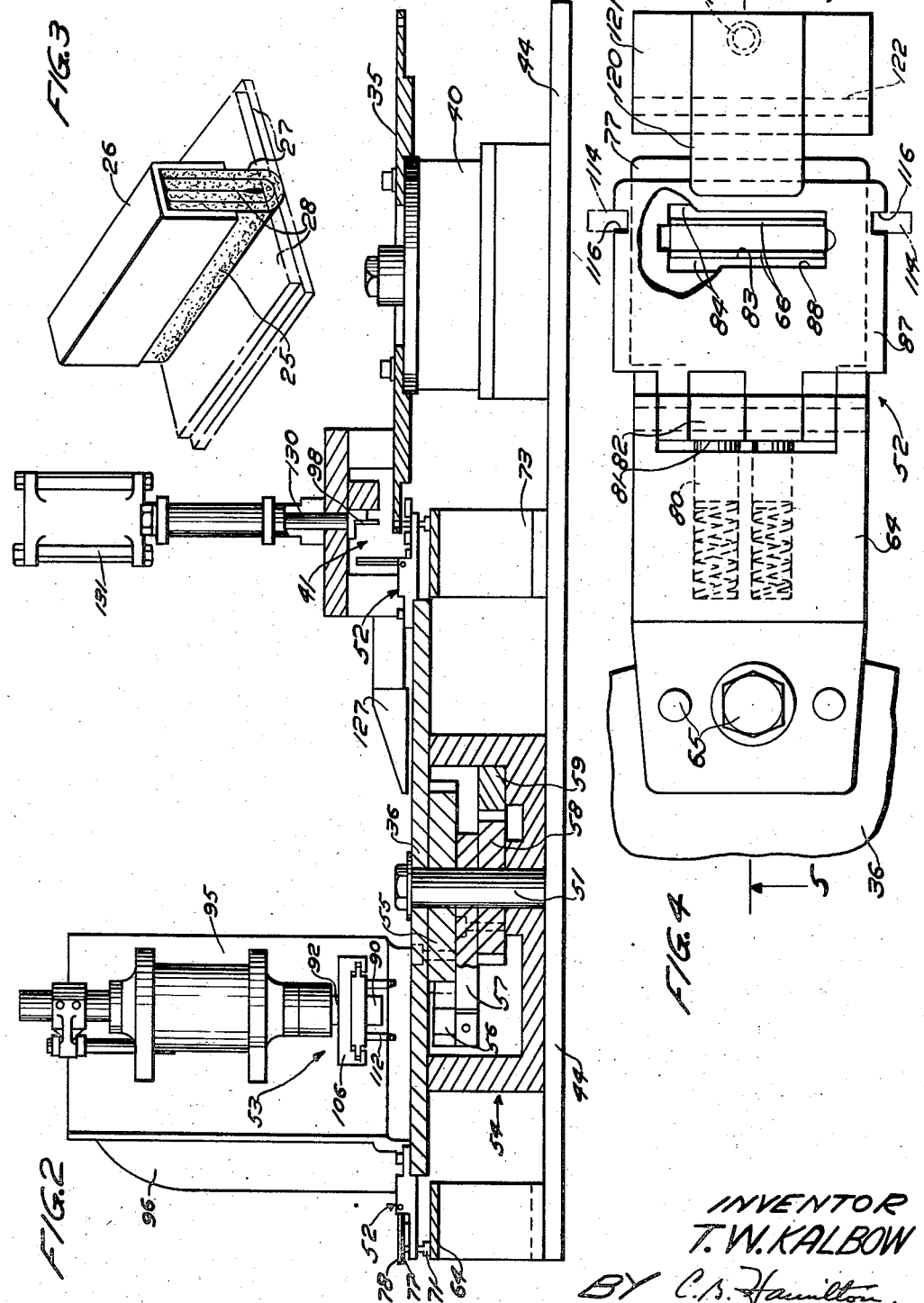
INVENTOR
T. W. KALBOW
BY C. B. Hamilton
ATTORNEY

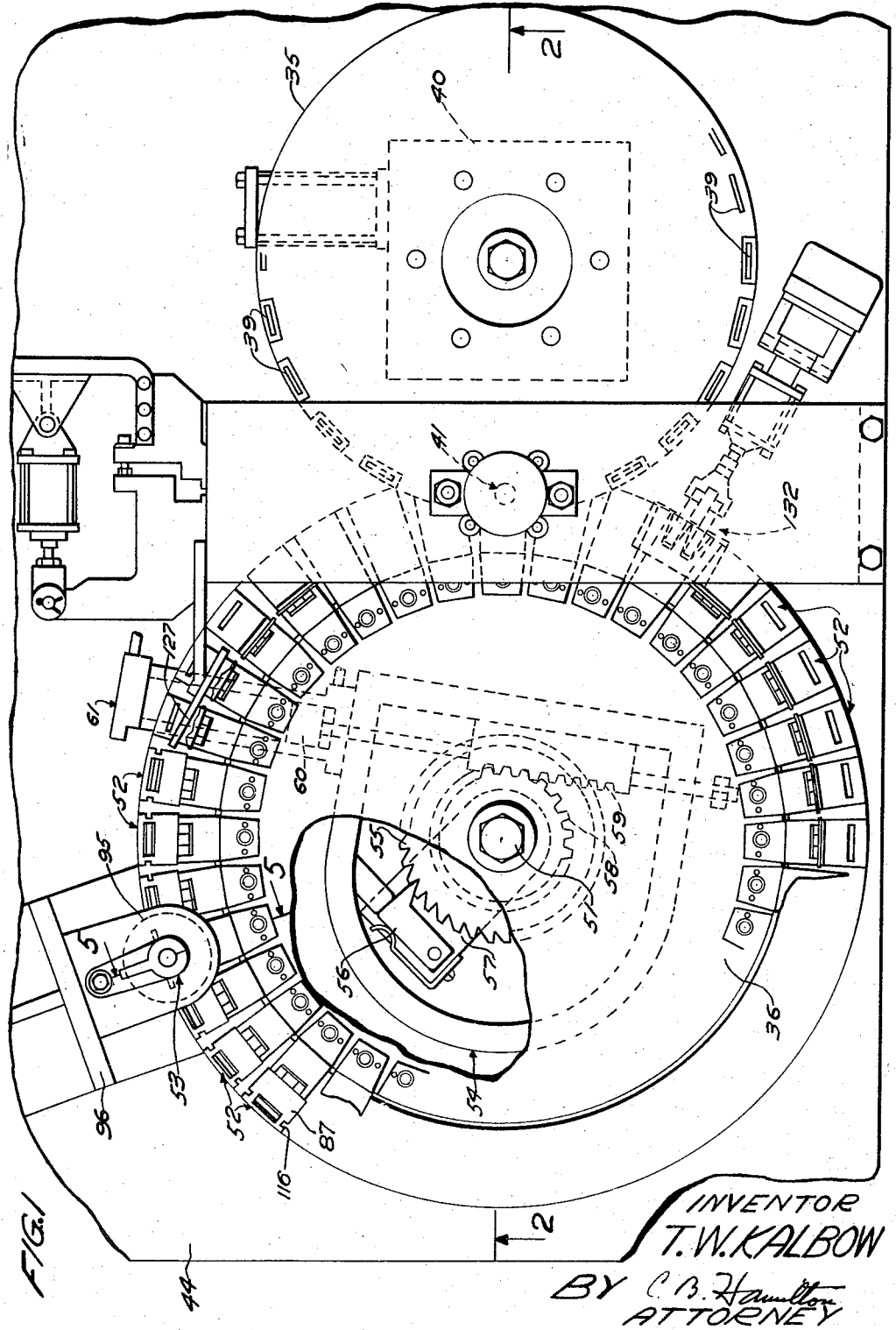

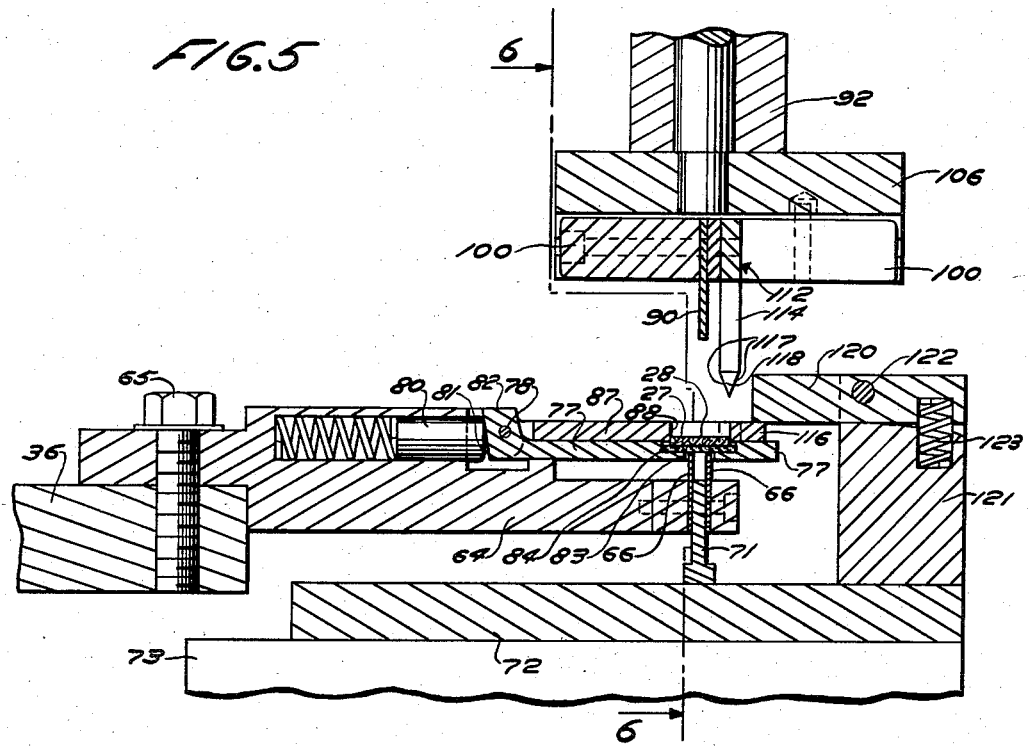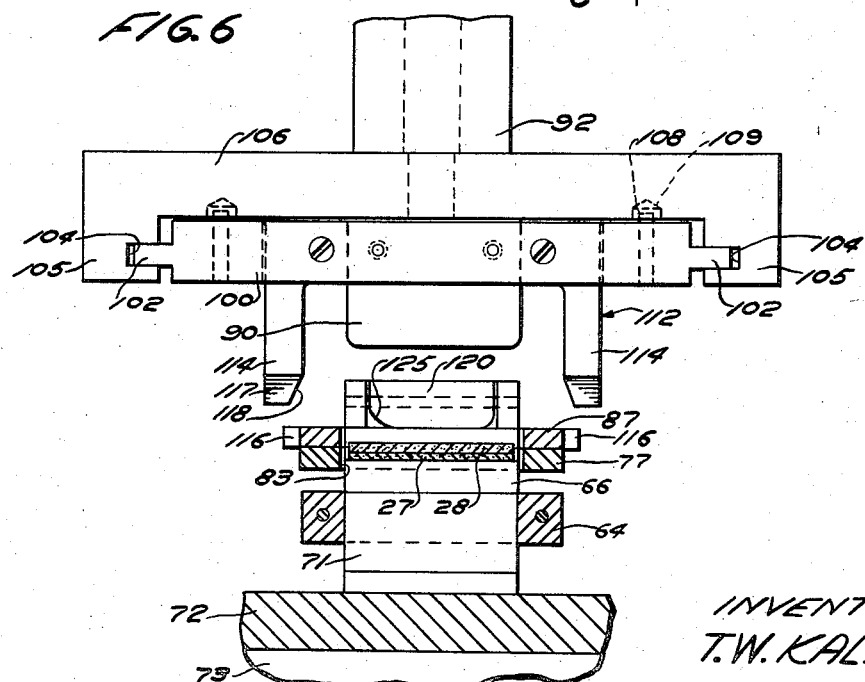

United States Patent Office 2,885,204
Patented May 5, 1959

2,885,204

ARTICLE FOLDING AND ASSEMBLING APPARATUS

Theodore W. Kalbow, Chicago, Ill., assignor to Western Electric Company, Incorporated, New York, N.Y., a corporation of New York Application July 22, 1955, Serial No. 523,876

2 Claims. (Cl. 270—83)

This invention relates to article folding and assembling apparatus and more particularly to an article assembling apparatus having means for mounting a tool for floating and self-aligning movement into engagement with articles to be assembled.

An object of the invention is to provide means in an article working apparatus for mounting a member for floating movement on a reciprocable actuator for movement therewith and for guiding the member laterally into accurate alignment with article holders and the articles thereon positioned in approximate alignment with the actuator.

A further object of the invention is to provide a pad folding and assembling apparatus having work holders for supporting the pads and moving them into a plurality of work stations and having means at one of said stations for floatingly mounting a pad folding tool on an actuator for self-aligning movement relative to the work holders and the pads at said station.

An apparatus illustrating certain features of the invention may include a carrier having a plurality of work holders for supporting the work, and a ratchet drive means for indexing the carrier to position the work holders and the work therein succesively at a plurality of work and assembling stations, the ratchet drive serving to position the holders and the work therein at one station in accurate alignment with the path of travel of a tool at said station and to position the holders and the work therein a a second station in approximate alignment with the path of travel of a tool actuator at this station. At the second station a tool is floatingly mounted on the tool actuator for movement toward the holder, and guide means on the tool cooperate with the holders to accurately guide the floating tool into engagement with the work to compensate for slight variations in alignment of the holders at this station.

Other objects and advantages of the invention will become apparent by reference to the following detailed description and the accompanying drawings illustrating a preferred embodiment thereof, in which:

Fig. 1 is a plan view of the pad folding and assembling apparatus with portions thereof shown in section;

Fig. 2 is a vertical sectional view of the apparatus taken along line 2—2 of Fig. 1;

Fig. 3 is a perspective view of the wiper pad assembly;

Fig. 4 is a fragmentary plan sectional view of the apparatus at the pad folding station;

Fig. 5 is a fragmentary vertical sectional view through the apparatus at the pad folding station taken along lines 5—5 of Figs. 1 and 4 and showing the floating mounting for a pad folding blade; and Fig. 6 is a fragmentary vertical sectional view through the apparatus at the pad folding station taken along line 6—6 of Fig. 5.

The present apparatus assembles wiper pads 25 into metal clips 26 (Fig. 3) and is an improvement on the apparatus disclosed in the co-pending application on an apparatus for folding and assembling wiper pads in metal clips, Serial No. 446,614, filed July 29, 1954, now Patent No. 2,839,821. The wiper pad 25 comprises rectangular strips of cloth 27 and 28 which are folded about their centerlines, compressed, and assembled within the clip 26.

The apparatus comprises a pair of intermittently rotatable work tables 35 and 36 mounted in horizontally spaced relation to each other with portions thereof in over-lapping relation. The table 35 has twenty-four rectangular apertures therein forming nests 39 for receiving the clips 26 and is mounted on and intermittently indexed by a well known type of indexing unit 40 to accurately position successive nests 39 and clips 26 therein in a predetermined position at an assembling station 41. The indexing unit is mounted on a base 44.

The feed table 36 has a plurality of work holders or wiper pad aligning and supporting fixtures 52 secured to the periphery of the feed table 36 for supporting the strips 27 and 28 and for carrying them successively into a folding station 53 where they are folded, and into the assembling station 41 where they are assembled with the clips 26. The table 36 is mounted on a shaft 51 of a ratchet type indexing unit 54, which is secured to the base 44 and includes a ratchet wheel 55 secured to the feed table 36. A feed pawl 56 for actuating the ratchet wheel is pivotally mounted on an arm 57 fixed to a gear 58, which is loosely mounted on the shaft 51 and meshes with a rack 59 connected to a piston 60 of a fluid actuator 61 which is operated to effect the indexing of the feed table 36.

Each of the wiper pad holding fixtures 52 comprises a horizontally disposed apertured member 64 (Figs. 4 and 5), which is secured to the table 36 by the screws and dowel pins 65 and has a pair of relatively thin vertically disposed resilient pad folding and retaining plates 66 mounted thereon in spaced and parallel relation to each other in the aperture therein and between which the cloth strips 27 and 28 are pushed to fold them. Portions of the plates 66 extend upwardly above the member 64 and the upper edges of the plate 66 are rounded to provide smooth surfaces for the cloth strips 27 and 28 to slide over as the strips are pushed therebetween. The space between the strip folding plates 66 receives the upper portion of a rectangular plunger 71, the upper end surface of which is level with the upper surface of the member 64 and the lower enlarged end of which rides on the upper flat surface of a supporting ring 72, which is mounted on the upper end of a plurality of brackets 73 fixed to the base 44.

A flat aligning member 77 is provided for supporting the strip of cloth 27 in a predetermined position adjacent the upper edges of the plates 66. The member 77 in the form of a plate is pivotally supported on a pin 78 mounted in bearings of the member 64 for movement to and from vertical and horizontal positions, and is yieldably maintained in either position by a spring pressed plunger 80 which cooperates with flat surfaces 81 and 82 on the member 77. An elongated opening 83 is formed in the member 77 for receiving the upper edge portions of the plates 66 therein, and recesses extending laterally from the opening form a rectangular seat 84 for supporting the strip 27 in a predetermined position relative to the plates 66. A flat aligning member 87 pivotally mounted on the pin 78 for movement to and from horizontal and vertical positions has a rectangular opening 88 for receiving and aligning the strip 28 in a predetermined position on the strip 27.

The pad forming strips 27 and 28 are manually placed in the strip aligning fixtures 52 and the feed table 36 is indexed to move the fixtures successively into the folding station 53 in a position below and in approximate alignment with a vertically reciprocable folding blade 90 for pressing the strips 27 and 28 between the plates 66 and folding them along the middle. The folding blade 90 is mounted on a piston rod 92 of a piston reciprocable in a cylinder of a fluid actuator 95 which is mounted on a frame 96 fixed to the base 44.

Due to slight inaccuracies and variations in the size and shape of the parts which make up the indexing mechanism, such as the spacing of the teeth of the ratchet wheel 55, the indexing movement imparted to the feed table 36 is not uniform but varies slightly. Thus, in the fabrication of the apparatus the fixtures 52 are secured to the feed table 36 to effect precise positioning of the fixtures 52 with the pad folding plates 66 and the folded pad therebetween at a predetermined location at the assembling station 41 in alignment with the nest 39 and clip 26 therein and with a vertically movable pusher 98 when the feed table 36 is indexed by the ratchet indexing mechanism 54. This is accomplished by operating the fluid actuator to index the feed table 36 and while the feed pawl 56 is at the end of its forward stroke and in engagement with a tooth on the ratchet wheel 55 and the feed table is held stationary, the fixture 52 is positioned on the feed wheel with the pad folding plates 66 in accurate alignment with the nest 39 in the table 35 and with the pusher 98, and while the fixture 52 is held in its accurately aligned position it is secured to the feed table by the screws and dowel pins 65. As a result of this manner of securing the pad holding fixtures to the feed table 36 the angular distance between them is not precisely the same. Thus, while the indexing mechanism 54 serves to accurately align successive fixtures 52 at the assembling station 41, the fixtures are not accurately aligned in a predetermined position in the folding station 53 but are indexed into various positions in close proximity thereto.

In order to obtain an accurate alignment of the folding blade 90 relative to the fixtures 52 at the folding station 42 to obtain the proper folding of the strips 27 and 28 between the plates 66, means are provided for floatingly mounting the folding blade 90 for lateral movement and guide means are provided for moving the blade laterally into proper alignment with the fixtures 52. The floating mounting means comprises a horizontally disposed member 100 (Figs. 5 and 6) to which the blade 90 is secured and which has reduced flat end portions 102—102 disposed in grooves 104 in members 105 for supporting the floating member 100 for limited horizontal movement. The members 105 are mounted on a plate 106 which is fastened to the piston rod 92 for vertical movement therewith. The blade 90 and the member 100 are thus supported for vertical movement with the piston and for floating horizontal movement in any direction relative thereto, which movement is limited by a pair of pins 108 extending upwardly from the member 100 into recesses 109 in the plate 106. The blade 90 is moved laterally into proper alignment with the fixture 52 by an aligning member 112 secured to the floating supporting member 100 and cooperating with the members 87 of the fixtures 52. The aligning member 112 shown herein is U-shaped and has a pair of downwardly extending legs 114 of rectangular cross section which are adapted to fit into rectangular notches 116 at the side edges of the members 87 for accurately positioning the blade 90 laterally relative to the fixture. The lower portion of the legs 114 have sloping surfaces 117 and 118 to form cams on the ends of the legs which enter the notches 116 of the plates 87 as the aligning member 112 is moved downwardly and cooperate with the side walls of the notches to move the legs 114 into the notches 116 and move the blade 90 laterally into its proper alignment with the fixture 52 prior to engagement of the folding blade 90 with the strips 27 and 28 to effect the proper folding of the strips as they are pushed downwardly by the blade 90 between the folding plates 66.

A hold-down member 120 is provided at the folding station for holding the end of the strip aligning member 87 down in its horizontal position to prevent its accidental upward displacement during the pad folding operation. The hold-down member 120 is mounted on a support 121 for pivotal movement on a pin 122 and is stressed by a spring 123 for counterclockwise rotation as viewed in Fig. 5 to a substantially horizontal position with one end thereof in the path of movement of the aligning members 87. As the feed table 36 indexes, the aligning plates 87 engage a curved surface 125 of the hold-down member and slide thereunder and are yieldably held down thereby while the folding blade 90 and the guide 112 are reciprocated to effect the alignment of the blade 90 with the strips 27 and 28 and the pushing and folding of the latter between the plates 66.

After the strips 27 and 28 have been folded and pushed between the plates 66 on the fixture 52, the fixture is moved step by step from the folding station 53 to the assembling station 41, during which travel a stationary cam 127 raises the aligning members 77, 87 from horizontal to vertical positions. At the assembling station 41 the folded pad 25 and the plates 66 supporting it are vertically aligned with a clip 26 in a nest 39 of the feed table 35 and with the pusher 98, which is mounted on the lower end of a rod 130 of an actuator 131 and is actuated thereby to push the clip 26 from the nest 39 onto the plates 66 and the folded pad 25 therebetween. At an ejector station 132 means are provided to raise the plunger 71 to push the folded pad 25 and the clip 26 from the plates 66 into assembled relation with each other. Control means are provided for operating the various actuating means in timed relation to each other.

With the construction described above it will thus be seen that the feed tables are indexed to accurately align the fixtures 52 and the nests 39 at the assembling station 41 to position the clips 26 and the folded wiper pad 25 below and in vertical alignment with the pusher 98 for the assembly of the clip 26 onto the wiper pad 25, and that the floating mounting and guide means for the folding blade 90 serve to properly align the folding blade with the slightly misaligned fixtures 52 at the folding station 53 for effecting the proper folding and pushing of the wiper pad strips 27 and 28 between the plates 66 on the fixture.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a pad folding and assembling apparatus having a folding station, the combination of an actuator reciprocable in a straight path at said folding station, a rotatable carrier, a plurality of spaced fixtures on said carrier having pairs of spaced members for folding pads pushed into the spaces therebetween, each of said fixtures having means including an apertured plate pivotally movable to an operative position for supporting a pad in a predetermined position adjacent said pair of spaced members, said plate having a pair of guideways, means for indexing said carrier to move successive fixtures into said folding station and into approximate alignment with the path of reciprocation of said actuator, a folding element at the folding station for pushing a pad from the pad-supporting plate into the space between the pair of members on the fixture to fold the pad, a first coupling member secured to said folding element, a second coupling member secured to the actuator, said coupling members being shaped to interconnect each other for reciprocable movement with said actuator and for limited movement of the first coupling member laterally relative to the second, a pair of guides on the first coupling member engageable in the guideways of the pad-supporting plate for locating the folding element in a predetermined aligned position relative to the pad and to the spaced members on the fixture, said guides having ends with converging cam surfaces engageable with the plate around the guideways thereof to cam the guides laterally into the guideways prior to the movement of the folding element into engagement with the pad.

2. In a pad folding and assembling apparatus having a folding station and an assembling station, the combination of an actuator reciprocable in a vertical path at said folding station, a rotatable carrier, a plurality of spaced fixtures on said carrier having pairs of spaced members for folding pads pushed therebetween, means including an apertured plate hingedly mounted on each of said fixtures and movable to a horizontal operative position for supporting a pad in a predetermined position above and adjacent to said pair of spaced members at the folding station and movable from the horizontal position to render the spaced members and the folded pad therebetween accessible at the assembling station, said plate having a pair of guideways, means for indexing said carrier to move the fixtures successively into said folding station and said assembling station and into approximate alignment with the path of reciprocation of said actuator at the folding station, a folding element at the folding station for pushing the pads from the pad-supporting plate into the space between the spaced pad folding members on the fixture to fold the pad, a first coupling member secured to said folding element, a second coupling member secured to the actuator, one of said coupling members having slotted portions engaging end portions of the other coupling member for coupling the folding element to the actuator for vertical movement therewith and for horizontal movement relative thereto, means for limiting the horizonal movement of the first coupling member relative to the second coupling member, a pair of guide elements depending from the first coupling member and movable into the guideways of the pad-supporting plate in response to downward movement of the actuator for locating the folding element in a predetermined vertically aligned position relative to the pad and to the spaced folding members on the fixture, said guide elements having ends with converging cam surfaces engageable with the plate around the guideways thereof to cam the guide elements horizontally into the guideways prior to the movement of the folding element into engagement with the pad.

References Cited in the file of this patent

UNITED STATES PATENTS

| | | |
|---|---|---|
| 1,243,728 | Gagnon | Oct. 23, 1917 |
| 1,474,066 | Brown | Nov. 13, 1923 |
| 1,999,192 | Holloway | Apr. 30, 1935 |
| 2,237,359 | Ott | Apr. 8, 1941 |
| 2,586,383 | Rieger | Feb. 19, 1952 |
| 2,643,403 | MacBlane et al. | June 30, 1953 |

OTHER REFERENCES

Punches, Dies and Tools for Manufacturing in Presses; by J. U. Woodworth, published by the Norman W. Henley Publishing Co., New York, N.Y., pages 288–289.